US012275660B2

(12) United States Patent
Kania et al.

(10) Patent No.: US 12,275,660 B2
(45) Date of Patent: Apr. 15, 2025

(54) SYSTEMS AND METHODS OF BIOGENIC METHANE MITIGATION

(71) Applicant: Floating Island International Inc., Shepherd, MT (US)

(72) Inventors: Bruce G. Kania, Shepherd, MT (US); Anne Kania, Shepherd, MT (US); Cornelius Valkenburg, Shepherd, MT (US); Kevin Holland, Shepherd, MT (US)

( * ) Notice: Subject to any disclaimer, the term of this patent is extended or adjusted under 35 U.S.C. 154(b) by 0 days.

(21) Appl. No.: 18/640,022

(22) Filed: Apr. 19, 2024

(65) Prior Publication Data

US 2024/0351929 A1    Oct. 24, 2024

Related U.S. Application Data

(60) Provisional application No. 63/461,378, filed on Apr. 24, 2023.

(51) Int. Cl.
*C02F 3/34* (2023.01)
*C02F 1/74* (2023.01)
(Continued)

(52) U.S. Cl.
CPC ............... *C02F 3/348* (2013.01); *C02F 1/74* (2013.01); *C02F 2101/32* (2013.01); *C02F 2103/007* (2013.01); *C02F 2201/005* (2013.01)

(58) Field of Classification Search
CPC ........ C02F 3/348; C02F 1/74; C02F 2101/32; C02F 2103/007; C02F 2201/005
See application file for complete search history.

(56) References Cited

U.S. PATENT DOCUMENTS 5,487,834 A * 1/1996 Carman .................. B09C 1/10
        210/747.7
7,784,218 B2   8/2010 Kania et al.
(Continued)

FOREIGN PATENT DOCUMENTS

CA     3024256 A1    5/2020
EP     2682461 A1 *  1/2014  ............. C12N 11/14
WO  WO 2015/002544 A2  1/2015

OTHER PUBLICATIONS

International Search Report and Written Opinion mailed Jul. 29, 2024 in related International Patent Application No. PCT/US24/25307.

(Continued)

*Primary Examiner* — Liam Royce
(74) *Attorney, Agent, or Firm* — Eric L. Lane; Green Patent Law

(57) ABSTRACT

Biogenic methane mitigation systems and methods are provided comprising a floating island having two ends and being comprised of a biofilm-reactive matrix, an airlift system on one or both ends of the floating island, the airlift system comprising one or more pipes or hoses and an aeration system. Macro- and micro-treatment system bubbles are passed under and into the floating island, thereby exposing methane to active methanotroph culture and causing mitigation of the methane. A passive embodiment of the system does not require airlift technology but relies instead on natural or gravity-based circulation of methane containing water or methane in ebullition bubble form into floating island matrix, thereby exposing methane to active methanotroph culture and causing mitigation of the methane. Systems and methods for capturing and harvesting methane also are provided.

10 Claims, 13 Drawing Sheets

(51) Int. Cl.
  *C02F 101/32* (2006.01)
  *C02F 103/00* (2006.01)

(56) References Cited

U.S. PATENT DOCUMENTS

| | | | |
|---|---|---|---|
| 7,810,279 | B2 | 10/2010 | Kania et al. |
| 7,941,970 | B2 | 5/2011 | Kania et al. |
| 8,001,932 | B2 | 8/2011 | Kania et al. |
| 8,132,364 | B2 | 3/2012 | Kania et al. |
| 8,250,808 | B2 | 8/2012 | Kania et al. |
| 8,287,728 | B2 | 10/2012 | Kania et al. |
| 8,327,579 | B2 | 12/2012 | Kania et al. |
| 8,372,277 | B2 | 2/2013 | Kania et al. |
| 8,443,749 | B2 | 5/2013 | Kania et al. |
| 9,181,105 | B2 | 11/2015 | Kania et al. |
| 2005/0183331 | A1* | 8/2005 | Kania .................. A01K 61/70 47/65.5 |
| 2011/0005444 | A1 | 1/2011 | Kania et al. |
| 2011/0132822 | A1* | 6/2011 | Kaw .................. C02F 3/109 210/150 |
| 2011/0146559 | A1 | 6/2011 | Kania et al. |
| 2013/0125825 | A1 | 5/2013 | Kania et al. |
| 2017/0341942 | A1 | 11/2017 | Harper, Jr. |
| 2018/0026579 | A1 | 1/2018 | Kania et al. |
| 2018/0029902 | A1* | 2/2018 | Andrews .................. C02F 1/20 |

OTHER PUBLICATIONS

Kania, Water Has Emerged as The Low-Hanging Fruit for Climate Action, https://www.floatingislandinternational.com/blog/water-is-low-hanging-fruit-for-climate-action Jun. 9, 2021.
Kania, Where Has All the Carbon Gone, so Early in the Morning?, https://www.floatingislandinternational.com/blog/where-has-all-the-carbon-gone-so-early-in-the-morning, Jun. 24, 2021.
Kania, Climate Change Waits for No One, https://www.floatingislandinternational.com/blog/climate-change-waits-for-no-one, Oct. 13, 2021.
Kania, Actual Climate Action, https://www.floatingislandinternational.com/blog/actual-climate-action, Dec. 30, 2021.
Kania, The Methane Conundrum, https://www.floatingislandinternational.com/blog/the-methane-conundrum, Jan. 13, 2022.
Kania Strategic Climate Action Now Can Buy the Planet . . . https://www.floatingislandinternational.com/blog/strategic-climate-action-now-can-buy-the-planet-another-decade Jul. 2022.
Kania Prev Biogenic Methane . . . https://www.floatingislandinternational.com/blog/prevention-of-biogenic-methane-from-water-a-leveraged-and-fundamental-form-of-climate Sep. 2022.
Kania, What In The World Is Biogenic Methane? https://www.floatingislandinternational.com/blog/what-in-the-world-is-biogenic-methane, Oct. 13, 2022.
Kania Limited Climate Change—Harmful Algae . . . https://www.floatingislandinternational.com/blog/limited-climate-change-harmful-algae-blooms-deoxygenation-of-water-methane-2/2023.
Kania, Mitigating Methane Emissions, https://www.floatingislandinternational.com/biogenic-methane-mitigation.html Apr. 13, 2023.
Biofilm Reactor Chapters and Article, Science Direct (2009-2023), https://www.sciencedirect.com/topics/chemical-engineering/biofilm-reactor.

* cited by examiner

SYSTEMS AND METHODS OF BIOGENIC METHANE MITIGATION

CROSS-REFERENCE TO RELATED APPLICATION

This application is a non-provisional of and claims priority to and benefit of U.S. Patent Application Ser. No. 63/461,378, filed Apr. 24, 2023, which is hereby incorporated by reference in its entirety.

FIELD OF THE DISCLOSURE

The following disclosure relates to systems and methods of biogenic methane mitigation and systems for capturing and harvest methane utilizing floating islands.

BACKGROUND

Biogenic methane emitting from nutrient-impaired water is the most direct manifestation of climate change occurring today. It is on pace to exceed all sources of anthropogenic carbon dioxide emission vectors in climate change impact. This form of methane has occurred during Earth's past and has led to the single most extreme extinction event in Earth's history. Biogenic methane emits from wetlands, rice paddies, and massive reservoirs, as well as every form of waterway in between. Today's inclination by humanity to add nutrients to water contributes to and exacerbates biogenic methane generation. This form of methane is the single largest source of methane, and it outpaces emissions from oil and gas by some 40%.

Hotspots associated with this form of methane are now identifiable. Accordingly, the potential exists to capture and combust or biodigest at least a fraction of this extreme form of climate-changing greenhouse gas. Nitrous oxide, an even more extreme form of greenhouse gas, sometimes occurs in tandem with biogenic methane, and can also be reduced. Methane research has led to a means by which to pinpoint methane hotspots precisely. It is now known that under certain wintertime conditions, when a waterway is ice-covered, $CH_4$ hotspots manifest differently. Clouds of ebullition bubbles can be seen from above. In some instances, ice clarity is markedly different in such locations. The ice can be clear, compared to cloudy around the hotspot's perimeter. There can even be thinner ice, or actual open water.

Methane is generated biologically under anaerobic conditions. Springs that percolate into a waterway, especially in high-nutrient settings like those frequently associated with agriculture, can convey methane. The wintertime temperature of this groundwater is typically around 47 to 49 degrees F. Such water will be less dense than the 39-40-degree water that represents benthic water under stratified conditions. This warmer, methane-laden water represents a marker for methane hotspots.

Today's satellite imagery capabilities are significantly improved compared to the recent past. While today monitoring of methane emissions over water from space is complicated by refraction, monitoring of methane hotspots adjacent to water per the differentiation points noted here is possible. As such, this ability could represent a means by which to identify and place optimal methane mitigation systems. With today's carbon/methane credit voluntary market, this means by which to track methane hotspots could be an effective client identification advantage.

Biogenic methane gas is liquefied and held in stasis when generated under extreme pressure, as in water more than 50 meters deep. This condition occurs with some frequency in association with deep hydroelectric reservoirs. When the dissolved methane passes through the extreme oxygenation associated with hydroelectric turbines, a fraction of it gasifies and enters the atmosphere, where its concentrated deleterious climate-changing impact takes place.

There is potential to capture a fraction of this methane and expose it to biodigestion by methanotrophs. Strategically designed and positioned floating treatment wetlands can achieve this. A range of additional benefits is associated with this process, including: nutrients that otherwise spawn harmful algae blooms are additionally biodigested and cycled into methanotrophs/periphyton/aquatic food webs, resulting in a high level of waterway productivity; water quality and clarity is improved, allowing sunlight to contribute to a waterway's food web productivity. All of the above contribute to an aquatic system's biodiversity.

There are two primary engines of life: biological and solar. Heterotrophs rely primarily on one, autotrophs primarily on the other. By maximizing nature's wetland effect, both engines of life can be maximized. Archipelago islands and targeted aeration provide optimal conditions for both microbes and plants.

Biogenic methane emissions associated with fresh water include a number of flux pathways. While methane hotspots do occur, dispersal of highly effective strains of methanotrophs across all emission zones is highly desirable. As with any biofilm-generating microbe, surface area combined with optimization of circulation, nutrients, residence time, pH, temperature, and strategic harvest can maximize growth of a desired methanotroph culture.

Such optimization is not sufficient, however, to provide broad dispersal across every eco-zone of a waterway or reservoir. The goal is to quickly and effectively introduce methane-consuming methanotrophs across an entire waterway. Inoculation of a highly mobile form of forage, like minnows, with methanotrophs, could leverage a waterway's food web, and result in broad and cost-effective dispersal.

The archaea genus of microbe is an ancient strain that has existed on Earth for millions of years in a wide range of extreme environments. Methanogens, for example, thrive even in the gut of bovines as well as on surface area associated with thermal hot springs, or tundra, and extremely pressurized deep aquatic zones. Sticky biofilm, microbes, and their residue, is a base material for periphyton. This substance is ubiquitous in aquatic environments and coats all non-bacteriostatic surface area to some degree. Periphyton plays a fundamental role in the life model of many forms of forage, including minnows, as it is grazable. The fathead minnow, for example, consumes periphyton directly, and comes into direct contact with substrate in doing so. The slime associated with the outer surface of a minnow comes into direct contact with the microbes present in periphyton. This represents a natural form of inoculation.

It is also likely that methanotrophs can survive the relatively simple gastric system of minnows, just as methanogens survive in more complex and rigorous gastric settings. Floating treatment wetlands can form optimum hatcheries for both methanotrophs and minnows. And releasing methanotroph inoculated forage into waterways represents an elegant dispersal means.

Accordingly, there is a need for biogenic methane mitigation systems and methods capable of effectively dispersing methane-consuming methanotrophs. There is a need for systems and methods that can deploy methanotrophs to mitigate methane in reservoirs, lakes and wetlands. There is also a need for biogenic methane mitigation systems and methods that can quickly and effectively introduce and disperse methanotrophs across entire waterways.

SUMMARY

The present disclosure, in its many embodiments, alleviates to a great extent the disadvantages of known biogenic methane mitigation systems by providing innovative and effective systems and methods of biogenic methane mitigation. Disclosed biogenic methane mitigation systems and methods, referred to as XHAB, incorporate floating island, floatovoltaic (floating island plus photovoltaics), and/or solar/thermal technology, to support and run state-of-the-art air/oxygenation and propulsion systems with which to strategically oxygenate anaerobic/anoxic bottom zones within nutrient-impaired freshwater systems.

Disclosed embodiments are based on the fact that very high volumes of methane are released through bottom outflow turbines associated with deep reservoirs. Floating treatment wetlands capable of growing in the extremely high-energy settings just downstream from such turbines represent a biomitigation prospect. Positioning the islands fitted with the disclosed mitigation systems on these wetlands captures the highest volume of this source of methane and exposes the methane to methanotrophs present within the biofilm reactive surface area that FTWs provide. As discussed in detail herein, this is an effective means to mitigate and prevent high volumes of climate-impactful methane from gasifying into the atmosphere.

Biogenic methane can ebullate into nutrient-impaired water from benthic sludge over a broad area of a freshwater waterway. Maintaining dissolved oxygen over the hyperlimnion of nutrient-impaired waterways can result in a standing population of methanotrophs, at least in the top layer of sludge. The methanotrophs grow optimally given nitrogen, phosphorus, carbon and of course, methane, and a 0.1 ppm or greater concentration of dissolved oxygen. Such a population will biodigest at least a fraction of associated biogenic methane.

A high volume of water flow can disturb colloidal and more concentrated sludge particulates, at both inflow and outflow points. This disruption results in surges of biogenic methane ebullition. Positioning a biofilm-reactive floating treatment wetland on the surface, immediately above inflow and outflow points, provides a means to biodigest and oxygenate said methane bubbles. Disclosed valve control mechanisms can shift water flow and transition flow to alternate between inflow and outflow points.

Nutrients and carbon feed methane emission. Accordingly, cycling of nutrients into healthy food webs is a critical priority, as such cycling represents a desirable alternative to biogenic methane emission into the atmosphere. The ultimate goal is to cycle nutrients and corresponding carbon, per the Redfield ratio, into healthy food webs. Nutrients cycle into biota at least 4.5 times faster under aerobic conditions, versus anaerobic. However, other parameters including temperature, residence time, and dissolved oxygen concentration, influence this process. Disclosed embodiments provide specific management potential for each of these critical stewardship parameters. For example, our system can pull anaerobic water from the hypolimnion, the benthic zone, add oxygen, optionally blend with appropriate temperature water, maintain flow in position at optimal rate over optimal substrate, for critical food web functions including spawning channels for fish or sustenance of methanotrophs on the top layer of benthic sludge.

While the above represent broad critical water stewardship parameters, biogenic methane occurs in a far more concentrated volume where underwater springs percolate into a waterway. Such locations represent point source emission sites. Positioning floating treatment wetlands (FTWs) immediately above, at the surface of such points, represents an opportunity to biodigest methane before it emits into Earth's atmosphere. Another point source emission location occurs just downstream from deep reservoir turbine outflow points, where dissolved methane is capable of gasifying and emitting into earth's atmosphere. The systems and methods described herein can mitigate biogenic methane in both settings.

Benthic oxygenation will achieve at least three key results. First, a population of archaea genus, aerobic, methane-consuming methanotrophs will be sustained on the surface of benthic sludge/sediment. This aerobic biofilm-generating form of microbe is limited by surface area, circulation, and oxygen. Methanotrophs can consume as much as 80% of ebullition-based biogenic methane, given a 0.1 ppm or higher sustenance level of dissolved oxygen.

Second, fresh water turns over seasonally in temperate zones. This phenomenon exposes cyanobacteria and other forms of blue-green algae (causing harmful algae blooms or HABs) that normally occur in upper stratified water to concentrated nutrients that have accumulated in the lower stratification zone. The nutrients are typically dispersed across the top strata of waterways during semi-annual turnover events. By maintaining aerobic status within stratified benthic water, many of the nutrients that would otherwise grow HABs will instead grow alternative aerobic biota. A fully oxygenated system will grow a biodiverse portfolio of aerobic biota that builds and sustains productive food webs.

Third, nutrients cycle through aerobic water at least 4.5 times faster than anoxic or anaerobic water. This results in active biofilm growth, which is a base for periphyton. At depth, other forms of phytoplankton, like diatoms, contribute to periphyton development. Unlike the blue/green or cyanobacteria form of macrophyte, diatom-based periphyton contributes to a steady state of oxygenation, further contributing to maintenance of an aerobic condition conducive to biogenic methane mitigation. Such a condition also further contributes to a healthy and highly productive food web.

Exemplary embodiments of a biogenic methane mitigation system comprise a floating island and an airlift system including an aeration system. The floating island has two ends and is comprised of a biofilm-reactive matrix. The floating island may have a water-impermeable top surface and a carbon substrate incorporated into the biofilm reactive matrix. The airlift system may be on one or both ends of the floating island and include one or more pipes or hoses. A combination of macro- and micro-treatment system bubbles are passed under and into the floating island, thereby exposing methane to active methanotroph culture and causing mitigation of the methane. In exemplary embodiments, the airlift system is an open channel system.

The floating island may be deployed above benthic sludge and the active methanotroph culture sustained on the surface of the benthic sludge. In exemplary embodiments, an optimum level of at least 0.1 ppm of dissolved oxygen is maintained at the top of the benthic sludge. The airlift system may have one more valves, which, when opened, allow the biofilm reactive matrix to be inoculated with the active methanotroph culture. The biogenic methane mitigation system may further comprise a deflector plate connected to the airlift system. In exemplary embodiments, the system includes at least one blower. The aeration system may comprise a micro-bubbler.

An exemplary biogenic methane mitigation system comprises a floating island, an airlift system including an aeration system, a deflector plate, a blower, and a bubbler. The floating island has two ends and is comprised of a biofilm-reactive matrix. The airlift system may be on one or both ends of the floating island and may comprise one or more pipes or hoses. The bubbler is configured to pass bubbles under and into the floating island. The bubbles may comprise macro- and micro-treatment system bubbles that expose methane to active methanotroph culture, which may perform in variable dissolved oxygen conditions. Exemplary embodiments further comprise a diffuser diffusing the bubbles. A tether may be provided to accommodate changes in water level.

A system for capturing and harvesting methane comprises a floating island comprised of a biofilm-reactive matrix and an airlift system on the floating island. The airlift system comprises one or more pipes and an aeration system including a blower blowing air and a bubbler configured to pass bubbles into water flowing in the one or more pipes, thereby facilitating capture and harvesting of methane. In exemplary embodiments, the airlift system is a closed system. The capturing and harvest system may further comprise a catalytic converter or a combustion chamber fluidly connected to one of the one or more pipes. The capturing and harvest system may further comprise a vented foam buildup plate connected to one of the one or more pipes.

Exemplary methods of mitigating biogenic methane comprise deploying a floating island on a surface of water and passing macro- and micro-treatment system bubbles under and into the floating island. The floating island includes a biofilm-reactive matrix with an active methanotroph culture and an airlift system on one or both ends of the floating island. Passing the bubbles under and into the floating island exposes methane to active methanotroph culture and causes mitigation of the methane.

In exemplary embodiments, the surface of benthic sludge and the methods disclosed herein sustain active methanotroph culture on the benthic sludge. An optimum level of at least 0.1 ppm of dissolved oxygen may be maintained on the benthic sludge. Exemplary methods further comprise installing a deflector system comprised of at least one deflector plate and at least one blower on the floating island. Exemplary methods further comprise forming channels in the floating island for propagation of the active methanotroph culture.

Methanotrophs are biofilm-generating microbes. They are limited by surface area and oxygen, thus the greatest concentrations will occur on particulates that settle onto the top of benthic sludge. The system is not intended to oxygenate all fresh water, but only stratified, nutrient-rich fresh water. It does so selectively, without mixing of stratified water layers. This is a critical point, in that the volume of stratified water is typically less than half of total water volume in a thermally stratified waterway.

Water is unique in that it is most dense at 40 degrees C., while other liquids become progressively denser as their temperatures lower. The temperature between 40 degrees and the freezing point of water is a window in which water can be stewarded into aerobic status without destratification. The addition of even ten ppm of oxygen will not influence buoyancy of water by even a small fraction. This suggests that the XHAB system can operate within at least two orders of magnitude of oxygenation without inducing mixing of stratified water.

Oxygen is readily communicated into low-oxygen-containing water. The XHAB leverages this factor. Our intent is to transfer massive volumes of oxygen into water that is otherwise anoxic or anaerobic, and in the process support propagation of aerobes, specifically the archaea genus of microbe that consumes biogenic methane. Maintaining a dynamic population of methanotrophs, especially in nutrient-impaired water where methane emissions will otherwise be high, will prevent a significant portion of the biogenic methane that will otherwise result in radical climate change.

The disclosed XHAB systems and methods employ any combination of nano, micro and standard bubbles to generate both thrust and oxygenation. The XHAB operates within a designable window, ultimately defined by treatment water's residence time in the system's treatment pipe and employs various forms of air and concentrated oxygen bubbler systems to maximize for oxygenation of water in its most dense form, without changing treatment water density. In settings where destratification is desired, however, the system can extend heat-from-air exposure time to maximize for oxygenation.

By passing macro- and micro-treatment system bubbles under and into a floating island, disclosed embodiments expose methane to active methanotroph culture. This advantageously results in mitigation of methane and, possibly, mitigation of PFAS compounds. These systems mitigate against the "first flush" phenomenon, where relatively high volumes of methane and hydrogen sulfide are emitted.

Disclosed embodiments can be used in conjunction with floating islands as described in one or more of U.S. Pat. Nos. 8,250,808, 8,327,579, 8,132,364, 8,372,277, 9,181,105, 7,784,218, 7,941,970, 7,810,279, and U.S. patent application Ser. No. 15/655,941, each of which is hereby incorporated by reference herein.

The following drawings expand on the various means by which to achieve biogenic methane mitigation. Since many of the associated points at which biogenic methane is currently being generated are off-grid, the XHAB may employ innovative solar and solar/thermal power generation systems, as depicted. It's also clear that countless additional variations on the theme of water propulsion and oxygenation are possible. Said variations are also considered and anticipated in this disclosure. Some of the accompanying drawings and graphics depict oxygenation and propulsion techniques, including but not limited to, an airlift charging substation and variations on bubble injection/baffles/tilt of runway/directional plate tilt/depth of runway/perforations of runway piping, angle of repose of runway, depth of intake and outtake of runway, and more. The accompanying drawings illustrate systems that bring deep water to the surface, aerate the water, and return the water to the deep zone.

Accordingly, it is seen that systems and methods of biogenic methane mitigation are provided. These and other features and advantages will be appreciated from review of the following detailed description, along with the accompanying figures in which like reference numbers refer to like parts throughout.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
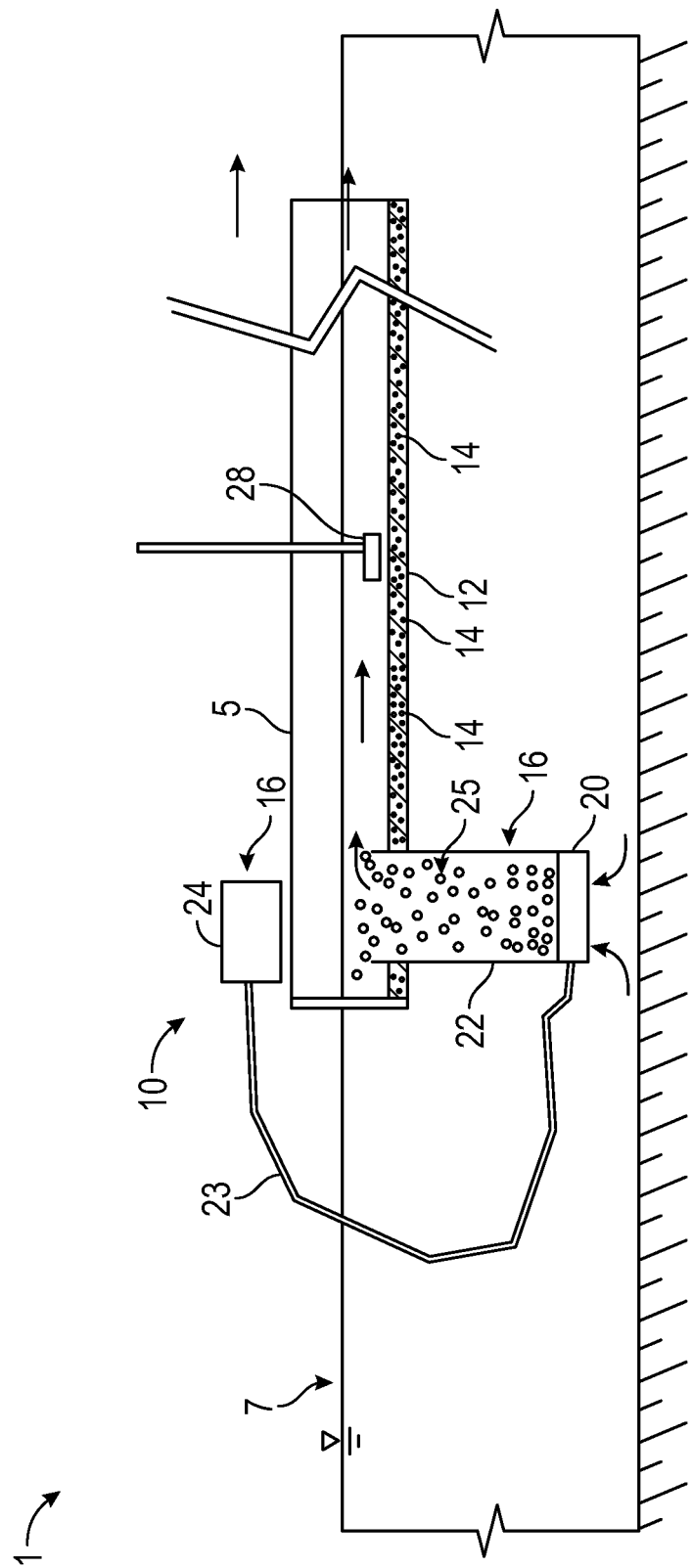
FIG. 1 is a side view of an exemplary embodiment of a system of biogenic methane mitigation showing an exemplary airlift system in accordance with the present disclosure.
Figure 2:
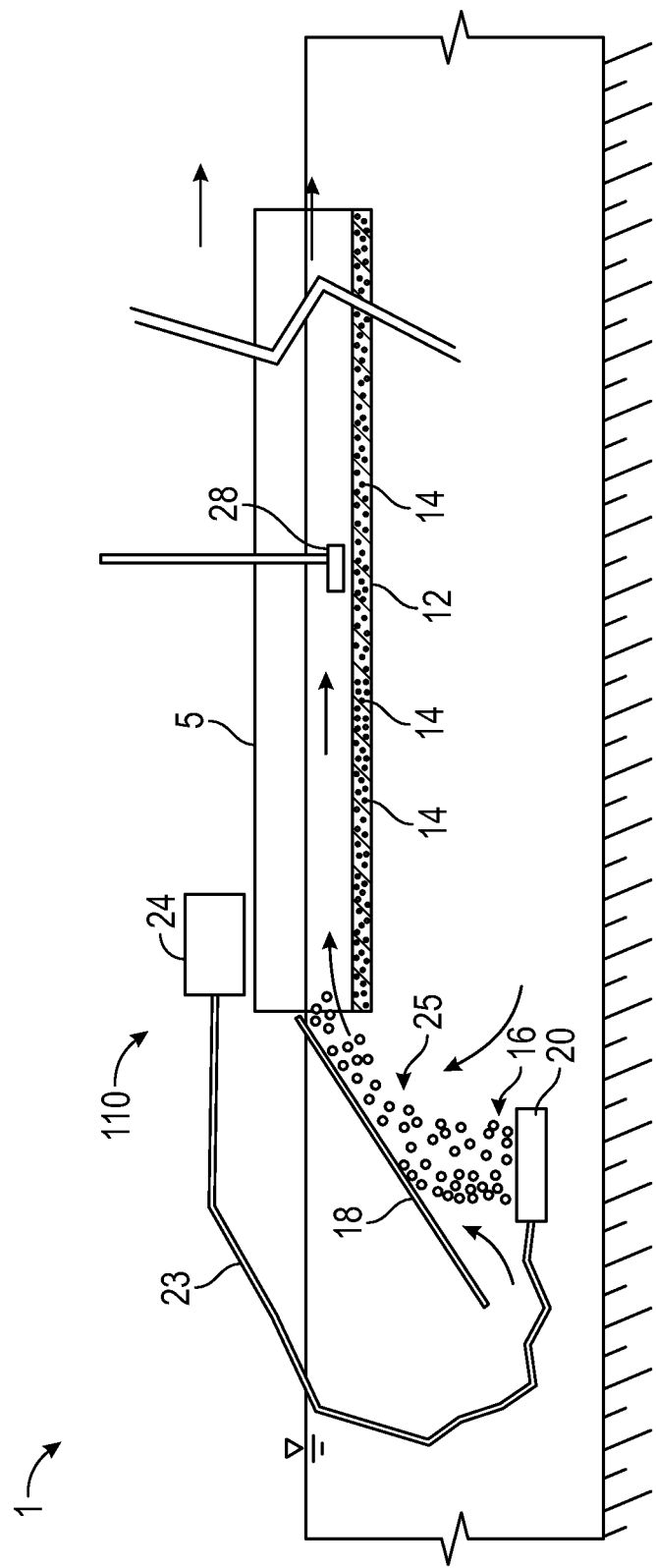
FIG. 2 is a side view of an exemplary embodiment of a system of biogenic methane mitigation showing an exemplary airlift system in accordance with the present disclosure.

In the following detailed description of exemplary embodiments of the disclosure, reference is made to the accompanying drawings, which are not drawn to scale and the illustrated components are not necessarily drawn proportionately to one another, in which like references indicate similar elements, and in which is shown by way of illustration specific embodiments in which disclosed systems and devices may be practiced. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

These embodiments are described in sufficient detail to enable those skilled in the art to practice the embodiments, and it is to be understood that other embodiments may be utilized and that logical, mechanical, functional, and other changes may be made without departing from the scope of the present disclosure. The following detailed description is, therefore, not to be taken in a limiting sense, and the scope of the present disclosure is defined by the appended claims. As used in the present disclosure, the term "or" shall be understood to be defined as a logical disjunction and shall not indicate an exclusive disjunction.

In exemplary embodiments, archipelagos of floating treatment wetland (FTW) modules, or floating islands, ideally seamless, are positioned over methane-emitting hotspots primarily associated with nutrient-impaired waterways. Biogenic methane ebullates from anaerobic layers of benthic sludge. If there is no aerobic cap or lid present on the uppermost layer of sludge, such methane perks through sediment and rises through the water column with minimal biodigestion by biofilm-generating methanotrophs that are limited by surface area. Such methane hotspots represent concentrated windows of opportunity for biomitigation within the biofilm reactive surface area provided by FTWs.

Fortunately, such biogenic methane hotspots typically only occur over a small fraction of the surface area associated with ponds, lakes and reservoirs, and points downstream from reservoirs. Archipelagos of FTWs can provide an effective lid between such methane and Earth's atmosphere. Even so, however, the relative costs of capping methane hotspots can be high, but disclosed embodiments advantageously reduce associated costs.

A means to defer costs, while still achieving a methane biodigestion goal, is as follows: Once the point source emission sites are identified, FTWs can be configured and positioned over the emission location. Planted FTWs over such points can sustain an active, standing population of methanotrophs, and provide them with the critical life support parameters of nutrients, carbon, dissolved oxygen, and methane.

Such FTW archipelagos may include gas barriers to prevent peripheral escape of methane between modules. The peripheral gas barriers may also serve as access walkways allowing for appropriate O&M activities on the FTWs. Such activities include plant and module stewardship. This can include harvesting top growth of plants, and maintenance of the internal and external tether system holding the archipelago in place, and occasional replacement of the carbon nodules that convey methane into the biofilm-reactive surface area immediately under the gas impermeable walkway.

With reference to FIGS. 1-4 exemplary embodiments of a biogenic methane mitigation system 1 will now be described. The system 1 comprises one or more floating islands 5, each island having two ends 6 with an airlift, or directional plate, system 10 incorporated onto the floating island at one or both ends. As discussed in more detail herein, the airlift system 10, 110, 210, 310 may be designed in various ways and typically includes one or more pipes 22 and/or hoses 23. Additional major components of the system 1 include an aeration system 16, a deflector plate 18, and a bubbler or diffuser 20. The floating island 5 is comprised of a biofilm-reactive matrix 12 that is inoculated with active methanotroph culture 14.

Figure 3:
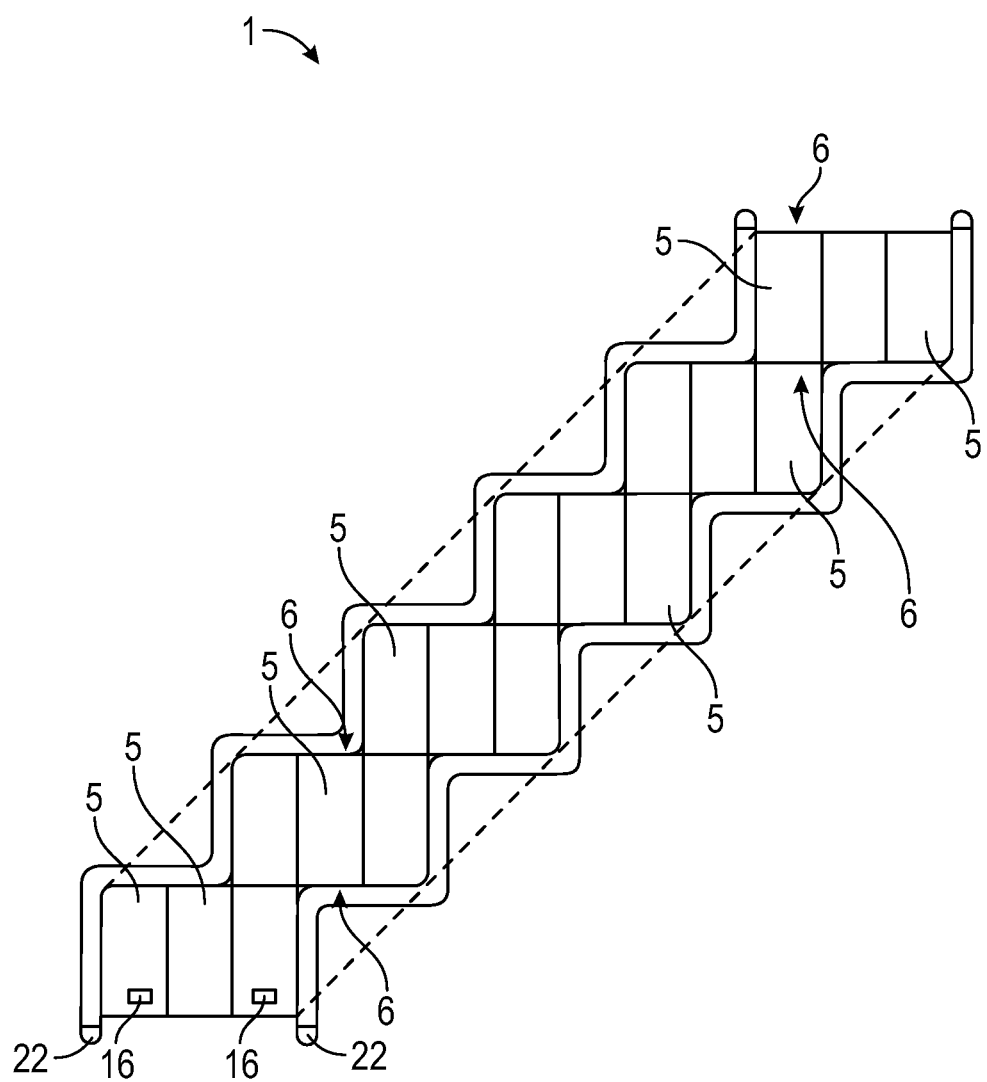
FIG. 3 is a top view of an exemplary embodiment of a system of biogenic methane mitigation showing an exemplary airlift system in accordance with the present disclosure.
Figure 4:
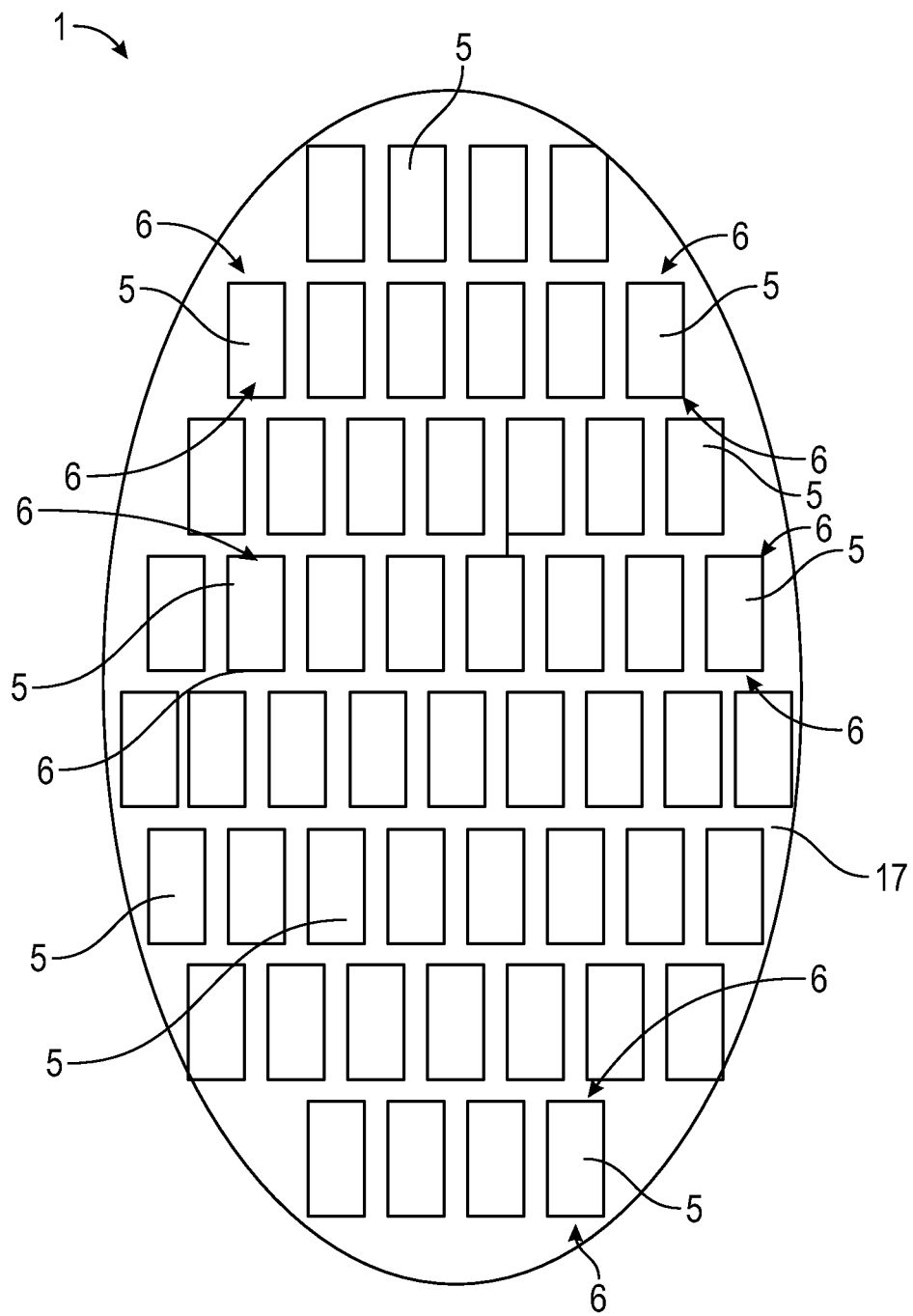
FIG. 4 is a top view of an exemplary embodiment of a system of biogenic methane mitigation showing a floating island array in accordance with the present disclosure.

As best seen in FIGS. 3 and 4, the biogenic methane mitigation system could be comprised of multiple islands 5 or island modules connected by impermeable walkways 17. Archipelagos of floating islands 5 are designably buoyant. Accordingly, they can designably support human traffic, or other features including macrophytes, solar panels, oxygenation technology, buildings and more. However, the space between modules 5 represents a gap through which ebullating greenhouse gas may escape into the atmosphere. The seams, where the walkway 17 connects with FTW modules 5 along module perimeters, must be as gas-impermeable as possible. The present disclosure responds to this potential issue by providing a gas-impermeable barrier between modules, forcing greenhouse gases, including methane, nitrous oxide, and carbon dioxide, to pass through saturated FTW matrix 12 before potentially accessing Earth's atmosphere. As such gas moves through FTWs 5, it is exposed to methanotrophs 14 and other microbes capable of biodigesting the gas.

Gas-impermeable sheeting 11 can be designably rigid to support a wide range of infrastructure, as well as human ingress and egress. Designing for gas-impermeable perimeter sealing of the sheeting 11 insures maximum biodigestion potential of the entire archipelago. By incorporating pressure-fitting perimeter connections along every edge of the sheeting 11 into this design, greenhouse gases are forced to move laterally instead of upwards, and in the process be exposed to FTW's biofilm reactive capacity. Since ebullating greenhouse gas is essentially low pressure once it gasifies, a simple pressure fit along the sheeting's perimeter is sufficient to guide most gas into FTW-saturated matrix 12. The gas impermeable walkway 17 could be made in whole or in part of buoyant concrete.

There are numerous ways to achieve the pressure fit required to fulfill this design. For example, sheeting 11 can be bolted down into matrix 12. It can also be forced into tight spacial fittings. The rigid sheeting 11 can include a soft foam-like material, to facilitate this pressure-fit feature. Such examples anticipate some small loss of gas, which is acceptable relative to present status, where a full range of greenhouse gas currently enters Earth's atmosphere unimpeded.

Figure 5:
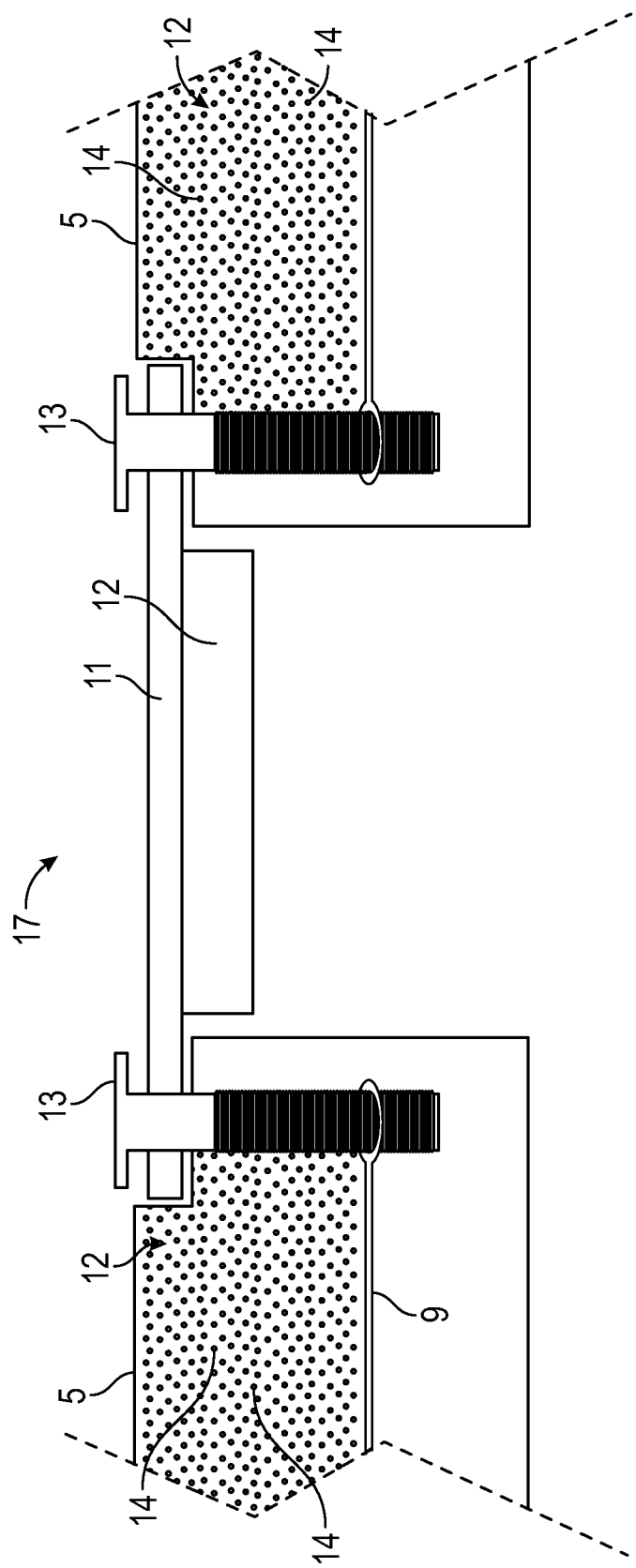
FIG. 5 is a side view of an exemplary embodiment of a module interconnection walkway for a biogenic methane mitigation in accordance with the present disclosure.

An exemplary structure for an interconnecting walkway 17 is shown in FIG. 5. It can be seen how square planted island modules 5 are connected by plates of gas-impermeable sheeting 11. An impermeable sheet 11 is laid across the matrix layer 12 and may be fixed to each floating island module 5 by connector pins 13 and a webbing attachment strap 9. The sheeting 11 connects each module 5, and rests on top of each module's perimeter, allowing for an air space along each module's entire perimeter.

The walkways 17 themselves can incorporate biofilm reactive surface area on their undersides, bonded in place, and vertical absorption nodules designed to lift/convect methane into the biofilm reactive surface area can be incorporated therein. The nodules can include an optimal, and ideally replaceable, carbon and nutrient component. Incorporation of a nodule replacement capability from the walkway 17 will expedite the process of sustaining methanotroph biodigestion of methane.

Other benefits of disclosed embodiments include that modules are seamless, which minimizes connection labor and breakdown. Also, the sizing of modules maximizes for freight efficiency. The module/walkway interface is readily assembled in the variable and sometimes rigorous natural settings associated with natural waterways. The sheeting can be sufficiently rigid to allow for human passage; thus, it can be walked on. This in turn allows for efficient O&M of islands, as well as density of macrophyte planting. Methane that has just passed through the extreme turbine phenomenon will gasify relatively quickly downstream of dams. Accordingly, it is critical that floating treatment wetlands in such settings be high-energy capable. Disclosed systems can function even with turbulence and changing water levels.

Biogenic methane hotspots associated with smaller waterways can be identified and targeted. Passive floating treatment wetlands that incorporate this gas barrier feature can be positioned immediately over such settings. Gas condensation will enhance for biomitigation of this methane, as the gas condenses on the bottom of the sheeting and drips back into water and island matrix. This design minimizes the volume of FTW needed to mitigate concentrated biogenic methane hotspots. Baseline measurement is fundamental to maximize for both efficacy and cost effectiveness.

Figure 6:
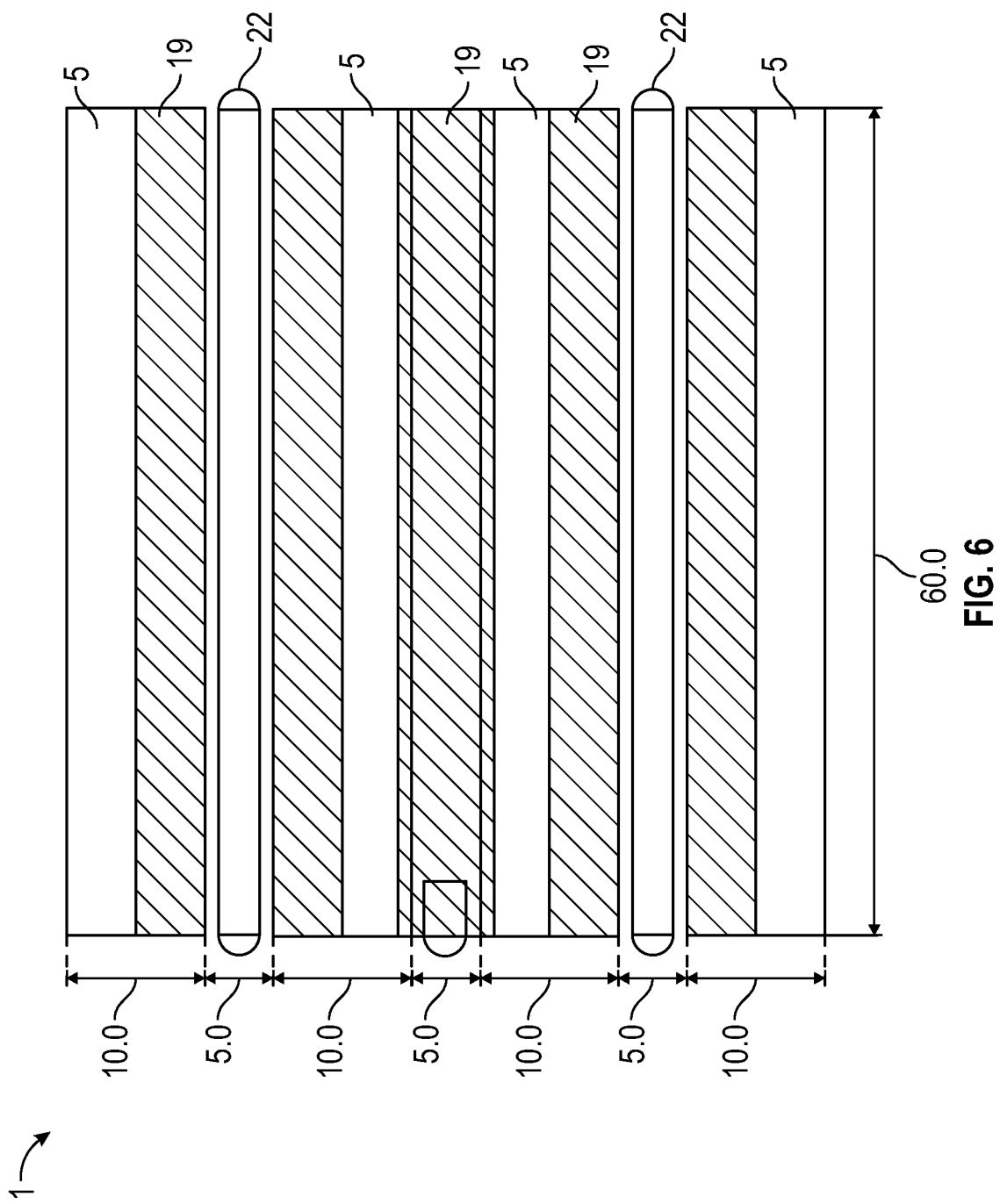
FIG. 6 is a top view of an exemplary embodiment of a system of biogenic methane mitigation in accordance with the present disclosure

As illustrated in FIG. 6, spawning channels 19 for protection of fish, birds, and other animals can be provided, and aeration pipes 22 might be located in the channels between modules 5. Exemplary embodiments have channels 19 for methanotroph/minnow propagation. The system 1 can allocate a small portion of oxygenated water into channels 19 built into the system for enhancement of both populations. Minnows will graze associated periphyton that occurs on channel perimeter matrix. The minnows can be released into the main waterway as a broad dispersal mechanism. Exemplary embodiments biomimic conditions conducive to both methanotrophs and a form of forage-like minnows. Higher-order biota will ultimately consume some of the minnows, and they will also disperse and in turn, inoculate other biota.

Advantageously, disclosed systems and methods optimize synergistic circulation. By opening a valve and pulling from the airlift flow volume, which is liftable by at least as much as 14 inches above static waterbody level, island biofilm reactive matrix 12 can be inoculated with benthic-adapted archaea genus aerobic microbes capable of biodigesting methane. Inflow stratified benthic water, rich with nutrients and typically at 4.2 degrees C. can be valved off of the main piped inflow water volume and gravity flowed into island matrix 12 and over treatment pipe 22 of the airlift system 10, 110, 210, 310.

This process results in ongoing exposure of methanotrophs 14 to the various forms of nitrogen, phosphorus, and nitrous oxide. Carbon substrate can be incorporated into island matrix 12 as well as macrophyte planting pockets spaced around the island. Additional carbon may be present as total suspended solids (TSS) in the inflow water, as well as in and around the plants and the humus they generate. Thus, the methanotrophs 14 have carbon, nitrogen and phosphorus, and dissolved oxygen, livable temperature range, and residence time, all within the island matrix 12.

The airlift system 10, 110, 210, 310 is built onto the floating island 5 at any part of the island. It could be one on or both ends 6 of the floating island 5, or be built so it is on neither end, and may cover or extend from different parts of the island. By incorporating the airlift system 10, 110 on the floating island 5, the biogenic methane mitigation system 1 can readily reverse flow of treatment water. This would likely expand the system's zone of oxygenation influence. The "charging station" design using solar panels or other off-grid energy production could enhance this potential.

The airlift system 10, 110, 210, 310 has a network of one or more pipes 22 or hoses 23 for injecting and moving air and treatment water through the airlift system and the greater system 1. Exemplary embodiments include PVC pipe filled with about three feet (though the amount and size could vary) of sludge with high organic content, with about a 3-foot (though the amount and volume could vary) layer of nutrient impaired water above the saturated sludge, mounted vertically. Pipe can be any suitable diameter, and in exemplary embodiments is 12 inches in diameter, and ten feet in length, providing four feet of headspace. Pipe may be lidded, to prevent methane loss. Control is identical sludge/water profile, left undisturbed. The test unit may be aerated and the methane concentration in headspace of pipes monitored.

The "open channel" airlift systems of use in the biogenic methane mitigation system 1 advantageously move a high volume of water. Disclosed designs for the "in-pipe" systems allow the system to return oxygenated water to the strata it was pulled from. Doing so quickly, to avoid temperature change, contributes greatly to the system's goal of oxygenating benthic water without destratification. Maintaining a level of a minimum of 0.1 ppm of dissolved oxygen at the top of benthic sludge is the target, but other levels could work as well. This minimal concentration of dissolved oxygen sustains a biogenic methane consuming population of archaea genus methanotrophs and reduces ebullition-based methane generated in benthic sludge by as much as 80%. Introduction air and whatever biogas it includes is vented off at the end of treatment surface to avoid interference with return treatment water to desired depth. As discussed in more detail herein, biogas in the headspace of the enclosed, in-pipe, including methane, nitrous oxide, and hydrogen sulfide may be combusted or sparged into biofilm reactive floating island matrix for optimal reduction or mitigation.

Returning to FIG. 1, an exemplary airlift system 10 is built onto floating island 5, which sits on the surface of a body of water 7. The airlift system 10 includes a hose 23, suitable for moving compressed air, fluidly connected to an air blower 24 on one end and a diffuser 20 on the other end. An aeration system 16 may be provided and can include a small micro bubbler positioned at the interface between sludge and water. Embodiments of the airlift system 10, 110, 210, 310 advantageously reduce aquatic methane by sustaining a methane consuming population at this benthic sludge/water interface. Suspended solids associated with polluted water are typically concentrated at this interface, and provide concentrated surface area. By maintaining 0.1 ppm or more of dissolved oxygen an active population of methanotrophs can be sustained and in the process consume 50 to 80% of ebullition methane that is generated under anaerobic conditions in sludge.

Temperature and residence times vary but should be above the freezing point of water. Together, the air blower, hose, and diffuser may be referred to as an aeration system 16. The diffuser 20, which may be a bullseye diffuser, is located under an end 6 of the floating island 5 to generate air bubbles 25 from the water. In exemplary embodiments, the diffuser 20 is set up to be about one foot above the bottom of the body of water 7. The hose 23 extends from the air blower 24 located on or above the island 5 at or near an end 6 of the island to the diffuser 20 under water underneath the same end 6 of the island 5. Thus, the air blower 24 sends compressed air through the hose 23 to the diffuser 20 so it can generate air bubbles 25.

The bubbles 25 are passed under and into the floating island 5, thereby exposing methane in the water to the active methanotroph culture 14 and causing mitigation of the methane. More particularly, water flows through the diffuser 20 and macro- and/or micro-treatment system bubbles 25 rise up through riser pipe 22 into the streambed directly above the matrix channel floor of the floating island 5. The active methanotroph culture 14 in the biofilm-reactive matrix 12 digests methane that is in the water as it flows through. A velocity meter 28 may be provided to measure and display the velocity of the flowing water.

Turning again to FIG. 2, an airlift system 110 with an angled deflector plate 18 will now be described. The airlift system 110 is built onto floating island 5, which sits on the surface of a body of water 7. The hose 23, air blower 24, and diffuser 20 are configured similarly to those in the airlift system 10 shown in FIG. 1 and perform the same functions. In system 110, however, deflector plate 18 is connected to the airlift system 110 and set up at an angle relative to the floating island 5. Thus, instead of the water flowing from the diffuser 20 up through a riser pipe, the bubbles 25 generated by diffuser 20 float upwards and are guided by the angled deflector plate 18 into the streambed directly above the matrix channel floor of the floating island 5 for methane digestion by the active methanotroph culture 14 in the biofilm-reactive matrix 12.

This airlift system 110 with the angled deflector is more efficient at producing horizontal stream flow than airlift system 10 shown in FIG. 1. The unit output rate of this system 110 is 4.8 gpm/watt. Variations in the configuration and number of certain components are possible, e.g., the deflector plate could located at the riser outlet, and a single blower or two blowers could be used. A velocity meter 28 also may be provided.

It should be noted that transferring the high volume of oxygen generated by disclosed airlift blower technology into oxygen-starved benthic water may be limited by the surface area of induced bubbles 25. While nanobubbles may be the ultimate size scale, the pressure and generational challenges associated with their formation are limiting. Microbubbles represent a relatively efficient means by which to oxygenate benthic water. Combining the generation of microbubbles with high levels of induced turbulence over the shortest time period is our goal. Disclosed systems and methods target the highest level of oxygen transfer into benthic water flow over the shortest time, to prevent temperature change which would otherwise result in destratification. A person of ordinary skill in the art would understand that oxygen concentration technology could influence design prerogatives. It also should be noted that macrobubbles are vastly more efficient in terms of inducing high water volume flow than either micro- or nanobubbles.

Figure 7:
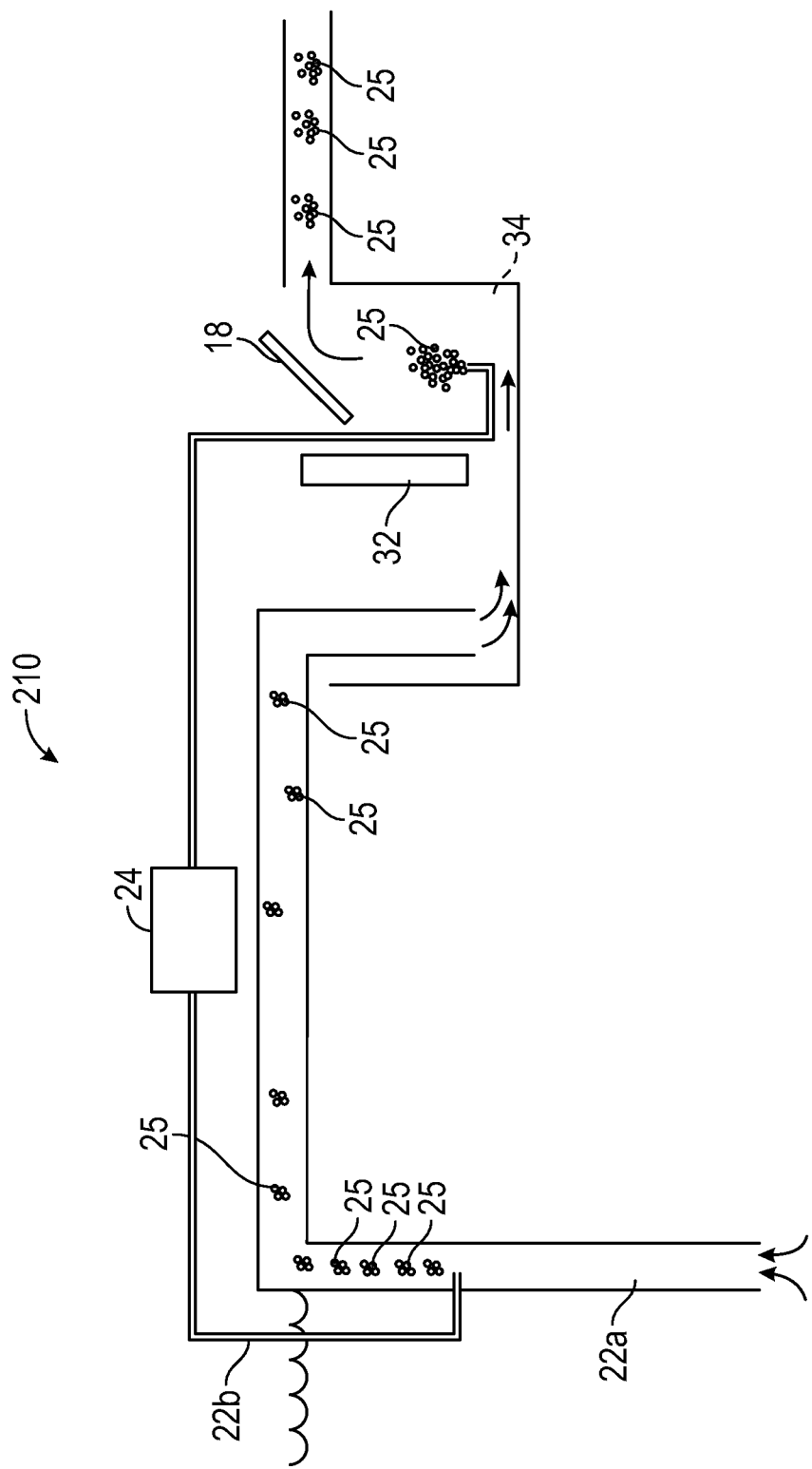
FIG. 7 is a side view of an exemplary embodiment of an airlift system in accordance with the present disclosure.

Turning to FIG. 7, airlift systems 210 could incorporate additional components and designs to optimize performance. An airlift system 210 with double air injection is illustrated in FIG. 7. Blower 24 is fluidly connected to water inlet pipe 22a by primary air injection pipe 22b, and a secondary air injection pipe 22c also is provided. Water and bubbles 25 flow through the system 210, passing divider wall 32 and going through a tank 34. From there, they are guided by angled deflector plate 18 into the aerated water outlet pipe 22d. Some of these embodiments result in aeration of water in the outlet pipe 22d and off-gassing of gases including methane, hydrogen sulfide, and/or nitrous oxide into the headspace above the water flow in the horizontal portion of the pipe 22e. This sets the stage for concentration of valuable and combustible methane, the prospect of flaring off the methane and nitrous oxide, or the re-direction of these gases into and through floating islands 5 to be biodigested.

Figure 8A:
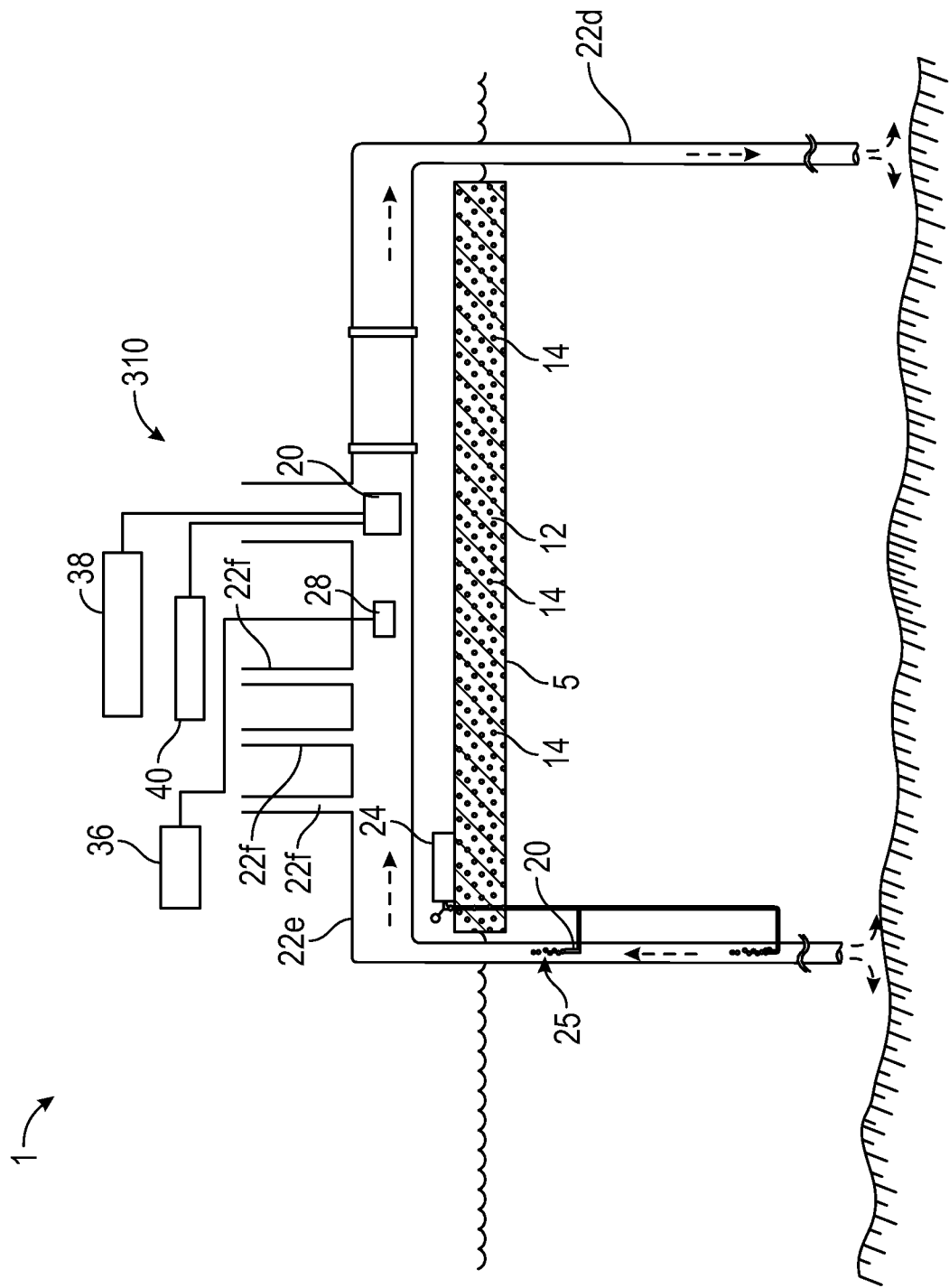
FIG. 8A is a side view of an exemplary embodiment of a methane capture and harvesting system showing an exemplary airlift system in accordance with the present disclosure.
Figure 8B:
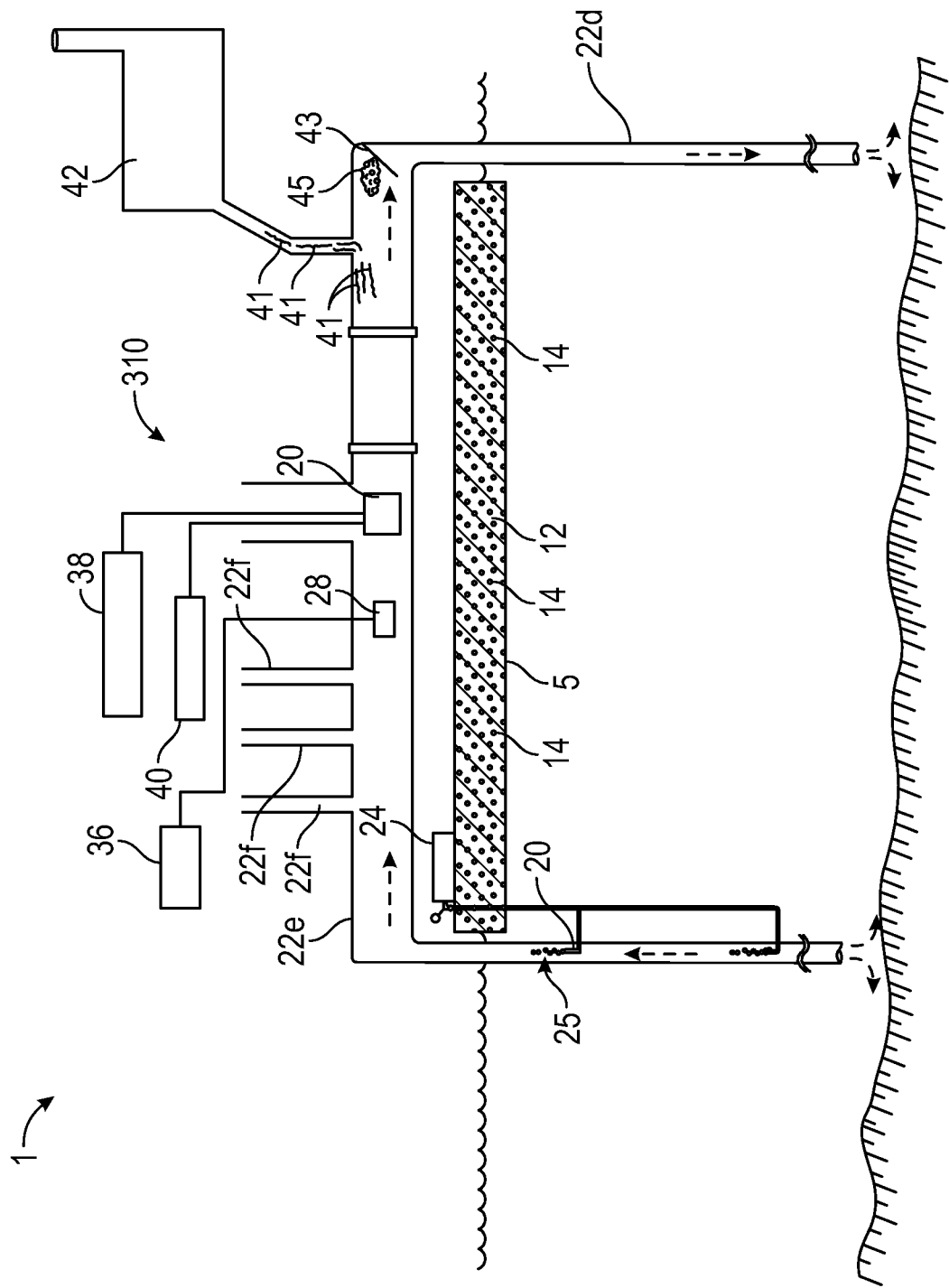
FIG. 8B is a side view of an exemplary embodiment of a methane capture and harvesting system showing an exemplary airlift system in accordance with the present disclosure.

As shown in FIGS. 8A and 8B, exemplary embodiments utilize enclosed pipe 22e in the airlift system 310. As discussed in detail herein, the closed, in-pipe system advantageously facilitates the capture and harvesting of methane, hydrogen sulfide, and nitrous oxide to be concentrated for commercial combustion or to be flared off or passed under the islands 5 for biodigestion. The enclosed pipe 22e may vary in size, and in exemplary embodiments, is 6- to 12-inch pipe. Enclosed pipe 22e has an inlet in a first section located in the body of water 7 where water flows in and a section that extends above the floating island 5 and a third section under water with an outlet where the water flows back into the body of water after treatment. A compressor or blower 24 provides air to diffuser or bubbler 20, which is fluidly connected to the first section of enclosed pipe 22e and injects air bubbles 25 into the water flowing up the pipe. The bubbles 25 travel through the enclosed pipe 22e above the floating island 5, thereby facilitating capture or harvesting of the methane and other gases.

A biogas reduction point occurs in the horizontal flume or pipe section of the in-pipe airlift system 310. Methane and hydrogen sulfide and nitrous oxide gas or liquid present within process water exposed to extreme turbulence induced by macro, micro and/or nano bubbles of air or oxygen in the horizontal section of the flume/pipe 22e is oxidized and present in the flume/pipe headspace. This combination of air and biogas can be vented off of the flume/pipe 22e through vent pipes 22f for commercial combustion. Alternatively, if the concentrations do not justify commercialization, the biogas can be flared off and transitioned into carbon dioxide, on a one for one basis.

FIG. 8B illustrates one way to flare off the off-gas 41 and make sure the methane or nitrous oxide is combusted. As shown, the off-gas 41 may be vented into a catalytic converter or combustion chamber 42 fluidly connected to pipe 22e. If heavy metals are involved, foam 45 may collect in pipe 22e. The foam 45 that accumulates in the horizontal portion of the airlift system 310 is likely to include concentrated per- and polyfluoroalkyl substances (PFAS) because the system pulls from the deep zone where PFAS ends up concentrating. The foam 45 containing PFAS can be readily harvested/skimmed off by incorporating a skimmer technology, e.g., a vented foam buildup plate 43 with a timed skimmer or suction device.

A molecule of methane or nitrous oxide can be transitioned on a one-for-one basis into a molecule of carbon dioxide. Since methane and nitrous oxide are many times more impactful than carbon dioxide, this process represents an effective greenhouse gas mitigation strategy. While hydrogen sulfide is not a greenhouse gas, it is both toxic and noxious. It can also be reduced by combustion. Alternatively, all three of these biogases can be sparged into and through a floating treatment wetland and cycled into microbes and their residue, ultimately forming the biofilm base of periphyton, a forage material to sustain and trigger a dynamic aquatic food web.

A velocity meter 28 and flowrate recorder 36 may be provided to measure and display the velocity and flow rate, respectively, of the flowing water. One or more vent pipes 22f off the main section of enclosed pipe 22e allow venting as the water flows through. In some embodiments, a compressed air supply 38 is in fluid connection with a second bubbler 20 or nanobubbler located in the main section of enclosed pipe 22e. Certain parameters are monitored, such as variation in methane concentrations over time and the presence of natural methanotrophs in both settings. These parameters can indicate efficacy of oxygenation of the benthic zone. Essentially, a lid of methanotrophs can mitigate biogenic methane emissions from nutrient-impaired water.

Figure 9:
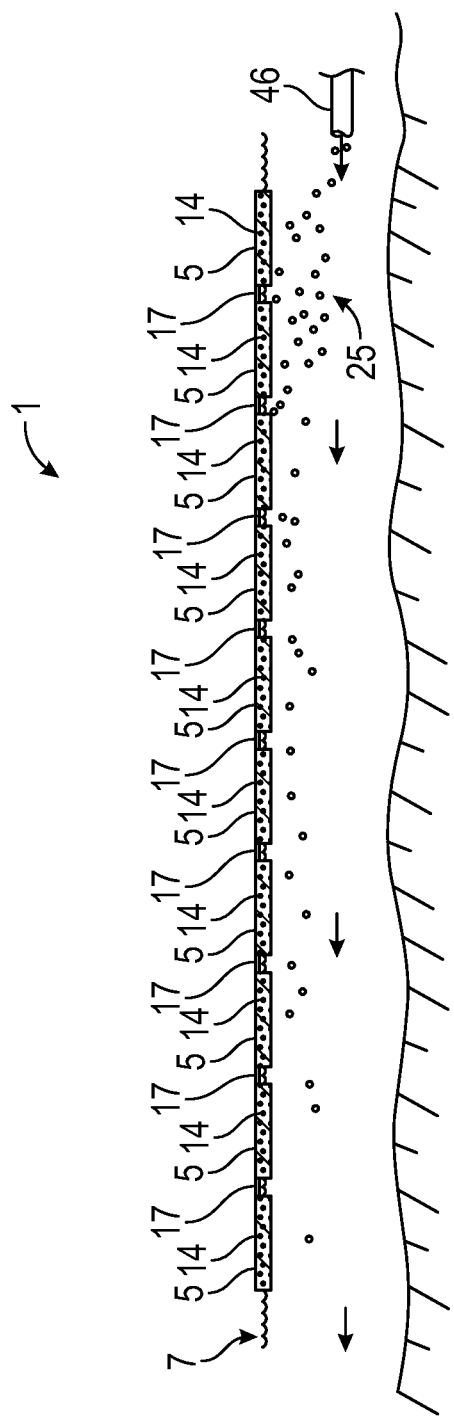
FIG. 9 is a side view of an exemplary embodiment of a system of biogenic methane mitigation used in connection with a hydroelectric turbine in accordance with the present disclosure.
Figure 10:
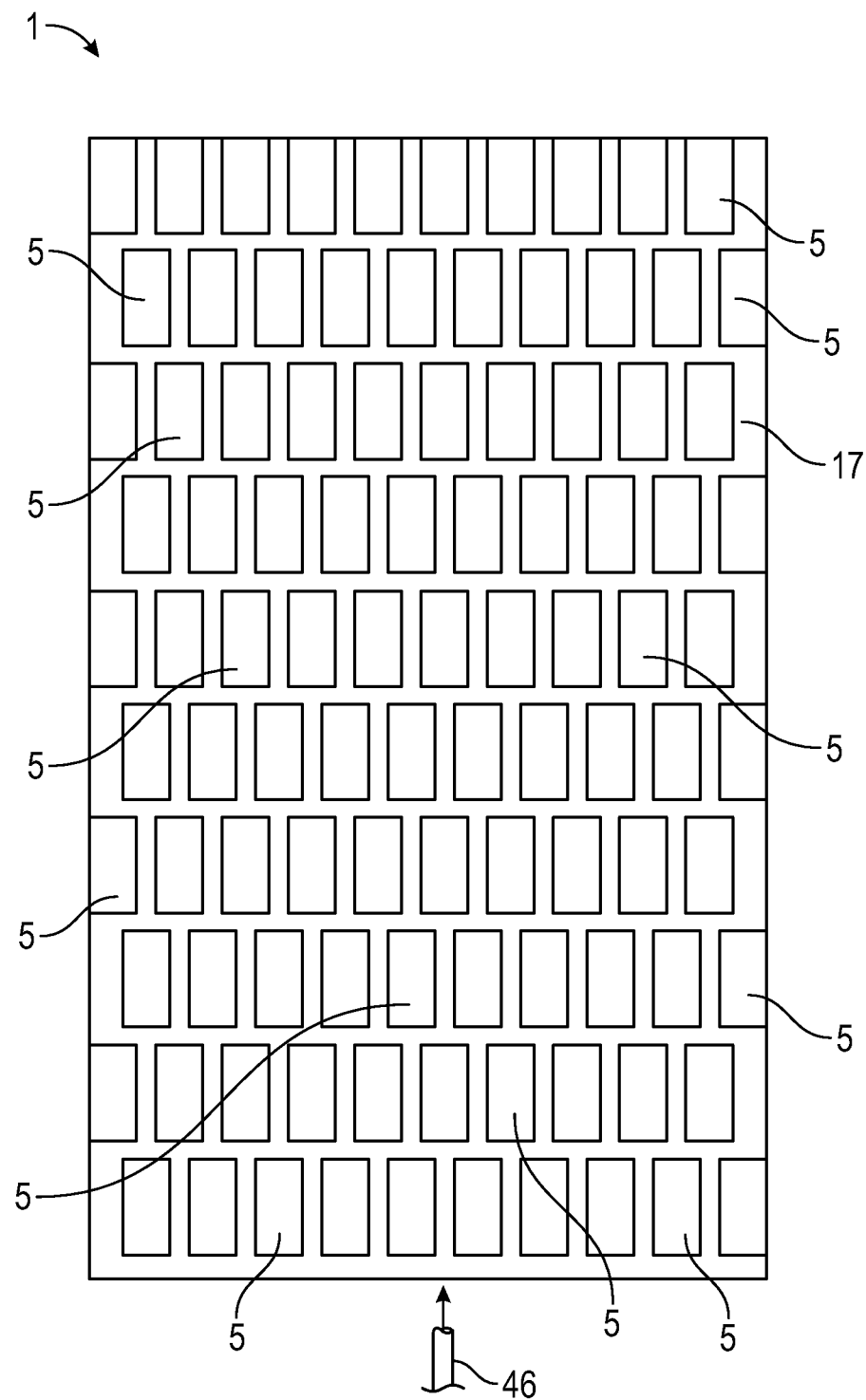
FIG. 10 is a top view of an exemplary embodiment of a system of biogenic methane mitigation used in connection with a hydroelectric turbine in accordance with the present disclosure.

Referring now to FIGS. 9 and 10, an important application for disclosed embodiments is hydroelectric turbines. It is apparent that very high volumes of methane are released through bottom outflow turbines associated with deep reservoirs. Biogenic methane gas is liquefied and held in stasis when generated under extreme pressure, as in water more than 50 meters deep. This condition occurs with some frequency in association with deep hydroelectric reservoirs. When the dissolved methane passes through the extreme oxygenation associated with hydroelectric turbines, a fraction of it gasifies and enters the atmosphere, where its concentrated deleterious climate-changing impact takes place.

An estimate is that as much as 80% of methane generated in a reservoir is released immediately below dam turbines. By measuring dissolved methane concentration in front of turbines, the amount of methane released downstream can be estimated from flow rate data and verified with atmospheric laser sensor systems, or by Eddy CoVariance monitoring.

Oxygenation of deep water above hydroelectric dams will maintain aerobic status of water that passes through turbines. Passive floating treatment wetlands positioned immediately downstream from turbines can maximize for strategic surface area and leverage the oxygenation associated with the water's exposure to turbines. Disclosed treatment processes reduce dissolved methane concentration when oxygenating a stratified layer selectively, whereas general deep-water oxygenation also results in reduced methane.

Passing methane through a biogenic methane mitigation system 10, 110, 210, 310 including islands 5 positioned immediately below turbines will digest some fraction of methane that otherwise releases directly into the atmosphere. Use of state-of-the-art methane monitoring technology can establish accurate baseline emission data. Positioning biofilm reactive surface area 12, in the form of floating islands 5, over water immediately after the water passes through the concentrated oxygenation effect provided by turbines and exits with gas bubbles 25 from a turbine outlet pipe 46, results in biological oxidation of the methane and reduces the volume that enters the atmosphere. Such a design can do this with no added mechanical input, but instead will strategically apply nature's wetland effect to address what is otherwise a massive point source of biogenic methane emissions, i.e., biogenic methane releases from below deep reservoirs 7.

Figure 11:
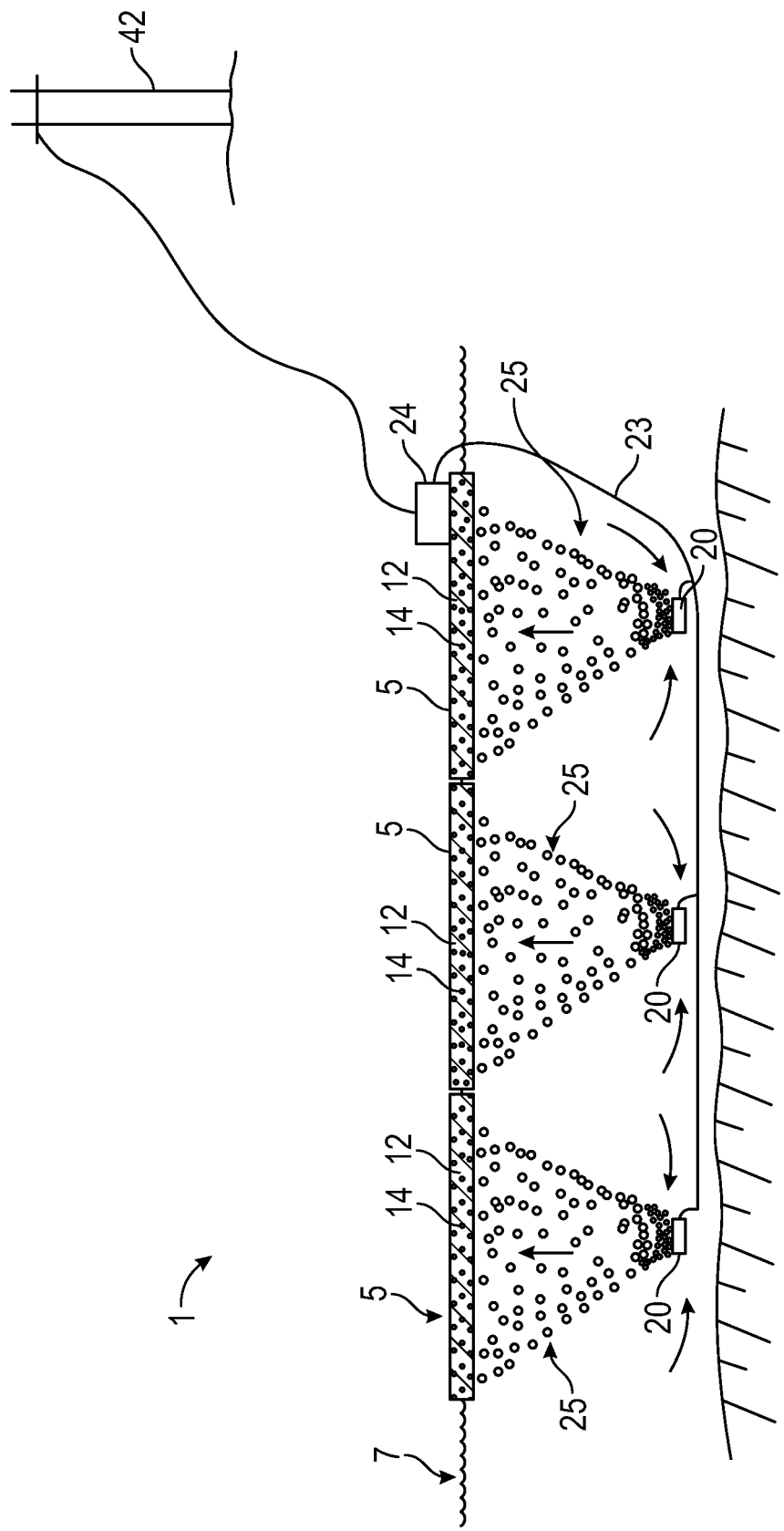
FIG. 11 is a side view of an exemplary embodiment of a system of biogenic methane mitigation using grid power in accordance with the present disclosure.
Figure 12:
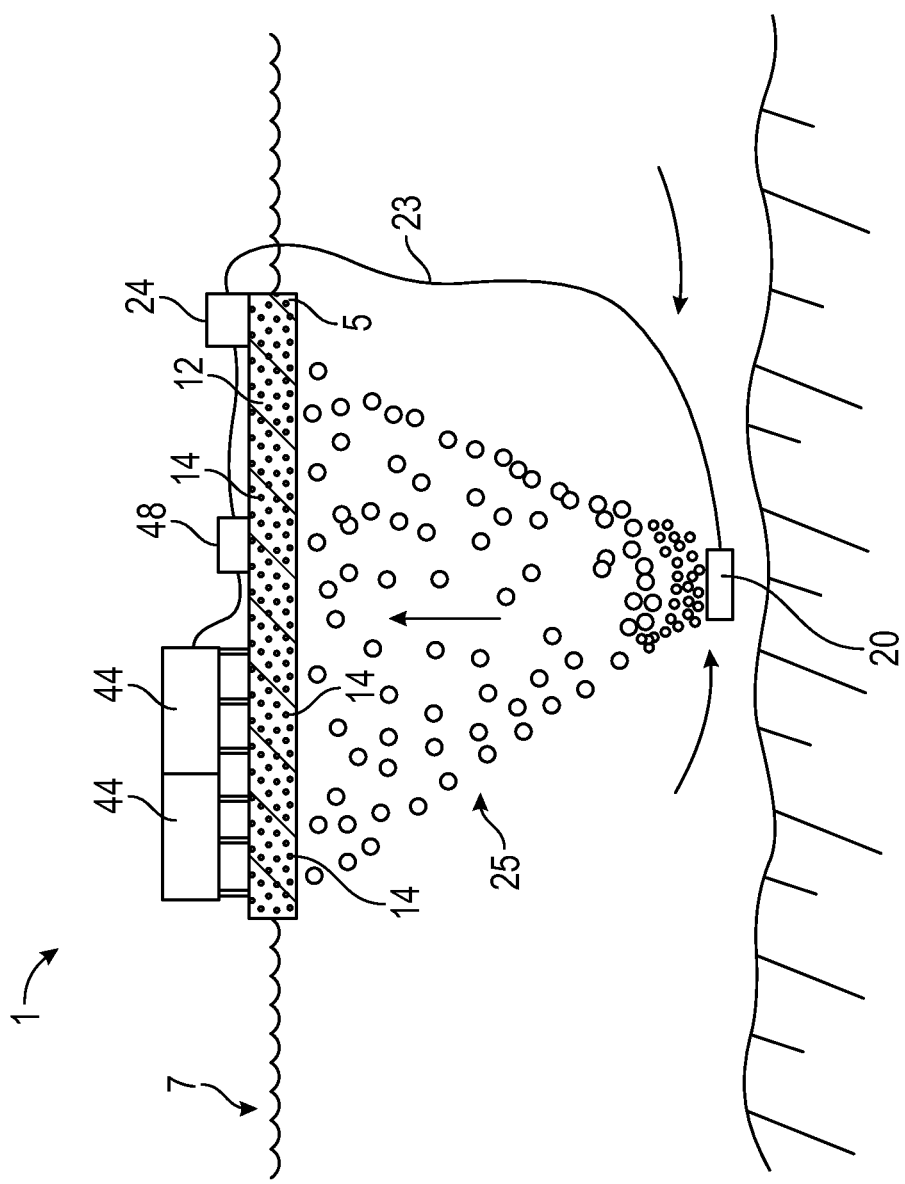
FIG. 12 is a side view of an exemplary embodiment of a system of biogenic methane mitigation using off-grid power in accordance with the present disclosure.

Exemplary embodiments employ various solutions to provide the power needed to run the system 1. As shown in FIGS. 8A and 8B, a DC power supply 40 may be provided. FIG. 11 illustrates a biogenic methane mitigation system 1 taking electricity from a grid-based power station 42. Many of the locations at which biogenic methane is generated are off-grid, so exemplary embodiments use solar panels 44 and/or solar/thermal power generation systems with one or more batteries 48 incorporated for energy storage, as depicted in FIG. 12. Combined floating islands and solar arrays are described in U.S. patent application Ser. No. 15/655,941, filed Jul. 21, 2017, which is hereby incorporated by reference in its entirety.

Advantageously, disclosed embodiments include unique features to sustain in high energy settings. These features include, but are not limited to, a water impermeable top surface to prevent continuous total saturation, which is likely to inhibit macrophyte growth, at least for optimal plant species; a matrix structure on the underside of islands to uplift and direct water flow into primary island matrix; a tether designed to accommodate rapidly changing water levels; internal reinforcement webbing to prevent FTW breakdown; a strain of methanotrophs that perform in high dissolved oxygen conditions, rather than 0.1-0.2 ppm.

Thus, it is seen that improved biogenic mitigation systems and systems for capturing and harvesting methane and associated methods are provided. It should be understood that any of the foregoing configurations and specialized components or chemical compounds may be interchangeably used with any of the systems of the preceding embodiments. Although illustrative embodiments are described hereinabove, it will be evident to one skilled in the art that various changes and modifications may be made therein without departing from the disclosure. It is intended in the appended claims to cover all such changes and modifications that fall within the true spirit and scope of the disclosure.

While the disclosed systems and devices have been described in terms of what are presently considered to be the most practical exemplary embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A biogenic methane mitigation system comprising:
a floating island having two ends and being comprised of a biofilm-reactive matrix;
an airlift system on one or both ends of the floating island, the airlift system comprising one or more pipes or hoses and an aeration system;
wherein macro-and micro-treatment system bubbles are passed under and into the floating island, thereby exposing methane to active methanotroph culture and causing mitigation of the methane.

2. The biogenic methane mitigation system of claim 1 wherein the airlift system is an open channel system.

3. The biogenic methane mitigation system of claim 1 wherein the floating island is deployed on a surface of a benthic sludge and the active methanotroph culture is sustained on the surface of the benthic sludge.

4. The biogenic methane mitigation system of claim 3 wherein an optimum level of at least 0.1 ppm of dissolved oxygen is maintained on the surface of the benthic sludge.

5. The biogenic methane mitigation system of claim 3 wherein opening a valve of the airlift system allows the biofilm reactive matrix to be inoculated with the active methanotroph culture.

6. The biogenic methane mitigation system of claim 1 further comprising a deflector plate connected to the airlift system.

7. The biogenic methane mitigation system of claim 1 wherein the aeration system comprises a micro-bubbler.

8. The biogenic methane mitigation system of claim 1 further comprising a diffuser diffusing the bubbles.

9. The biogenic methane mitigation system of claim 1 wherein the active methanotroph culture performs in high dissolved oxygen conditions.

10. The biogenic methane mitigation system of claim 1 further comprising a tether to accommodate changes in water level.

* * * * *